United States Patent
Svetlik (10) Patent No.: US 11,345,094 B1
(45) Date of Patent: May 31, 2022

(54) SIDEWALL FUSION METHOD FOR FUSING BRANCH OUTLETS TO HOST PLASTIC PIPE AND APPARATUS FOR USE THEREIN

(71) Applicant: Harvey E. Svetlik, Pipe Creek, TX (US)

(72) Inventor: Harvey E. Svetlik, Pipe Creek, TX (US)

(73) Assignee: Andrew J. Mayer, Jacksonville, FL (US)

( * ) Notice: Subject to any disclaimer, the term of this patent is extended or adjusted under 35 U.S.C. 154(b) by 0 days.

(21) Appl. No.: 17/301,445

(22) Filed: Apr. 2, 2021

(51) Int. Cl.
*B29C 65/30* (2006.01)
*B29C 65/00* (2006.01)

(52) U.S. Cl.
CPC ........ *B29C 65/30* (2013.01); *B29C 66/02241* (2013.01); *B29C 66/52241* (2013.01); *B29C 66/71* (2013.01)

(58) Field of Classification Search
CPC ... B29C 65/30; B29C 66/52241; B29C 66/71; B29C 66/02241
See application file for complete search history.

(56) References Cited

U.S. PATENT DOCUMENTS

| | | | |
|---|---|---|---|
| 3,616,024 A | 10/1971 | Windle | |
| 3,907,625 A * | 9/1975 | Vogelsanger | B29C 65/18 156/253 |
| 3,966,528 A | 6/1976 | Christie | |
| 4,352,708 A | 10/1982 | McElroy | |
| 4,533,424 A | 8/1985 | McElroy | |
| 5,505,811 A | 4/1996 | Welch et al. | |
| 6,239,412 B1 * | 5/2001 | Thoman | B29C 66/52298 219/243 |
| 9,791,085 B2 | 10/2017 | Morrow | |
| 2013/0076022 A1 * | 3/2013 | Wermelinger | B29C 66/81411 285/133.11 |
| 2016/0265704 A1 * | 9/2016 | Morrow | B29C 66/5221 |

* cited by examiner

*Primary Examiner* — Cynthia L Schaller
(74) *Attorney, Agent, or Firm* — Whitaker Chalk Swindle & Schwartz PLLC; Charles Gunter (57) ABSTRACT

A method and apparatus for attaching a branch polymeric fitting to a host polymeric pipe in which a flexible heating blanket is inserted between and used to heat the respective branch and host pipe surfaces. When the parts reach the appropriate temperature, the pipes are separated a small distance and the heating blanket is removed. The branch fitting and host pipe are then fused by placing the heated pipe ends in contact and applying pressure.

19 Claims, 4 Drawing Sheets

SIDEWALL FUSION METHOD FOR FUSING BRANCH OUTLETS TO HOST PLASTIC PIPE AND APPARATUS FOR USE THEREIN

BACKGROUND OF THE INVENTION

1. Field of the Invention

The present invention relates generally to the thermal joining of plastic pipe, such as polyethylene pipe and, more specifically, to the fusing of a sidewall fitting to the cylindrical walls of a main pipe conduit where a surface of the fitting and a portion of the cylindrical sidewall of the pipe are heated so that the surfaces are temporarily in a molten state.

2. Description of the Prior Art

In recent years, there has been a tremendous growth in industrial applications of thermoplastic piping for gas, water, sewage and chemical product handling, to name a few of such uses. There has been an increased realization of the desirable properties of plastic piping system including strength, durability, flexibility, resistance to chemical attack in addition to economy. These properties make thermoplastic systems safe, serviceable, rugged and economical for a variety of end applications.

With the tremendous growth in the use of thermoplastic pipes there has come the need for methods and tools for joining the pipe in different configurations. One advantage of providing piping systems which are constructed with thermoplastic components is that the piping and hardware may be joined or repaired through the use of a heat fusion method of welding. In this welding method, the surfaces of the members to be welded are first heated to the point where they begin to melt and then are pressed together until they solidify. The butt ends of thermoplastic pipe may be joined by facing the butt end of two pipes, heating the ends to a selected temperature until they become molten, and then pressing the two ends together. This will make a longitudinal joint which is as strong as the original pipe. The pipes and fittings to be joined vary in size with some measuring twelve inches in diameter or larger.

It is also well known that the facing ends of the two pipes must be heated to a specific temperature and be pressed together with a selected force in order to make a perfect joint.

Furthermore, in the joining of smaller pipes to large pipes various sizes of sidewall fittings are required. Particularly where such large pipe and mating fittings are used, equipment and techniques are required to assure that the fitting is properly aligned with the pipe, that the proper pressure is exerted on the fitting against the pipe and that the apparatus is quick and easy in its operation.

Joining apparatus and techniques presently used suffer from a number of drawbacks such as the lack of accurate means of exerting pressure on the fitting against the pipe main, means for quickly withdrawing the fitting from the heater element when the surfaces are properly plasticized and means for quickly engaging the fitting against the pipe before any cooling of the surfaces to be joined occurs. The absence of any one of these means may form a joint unacceptable or faulty for the purposes intended. The quick operation of the unit is necessary in that the weld will be of sufficient strength only if the contact material is properly plasticized at the time of joining. This can best be accomplished by heating the surfaces to be joined to the precise temperature required followed by immediate contact between the mating surfaces.

Many of the presently known devices and techniques utilize a heavy metal heater element with concave and convex surfaces for contacting the respective pipe sidewall and fitting end. After the heating step, the pipe surfaces must clear the heating element which requires that a large sized opening be created. This can allow unwanted heat losses. Also, with the heavy metal heater elements, separate tooling is required, for example, for 2", 4", 6", 8", up to 63" diameter branch-outlet tee fitting sizes.

Thus, despite the various advances that have been made in the plastic pipe joining arts, various disadvantages remain to be overcome.

SUMMARY OF THE INVENTION

This invention provides a heating apparatus and method for heat fusion of a plastic fitting to the exterior cylindrical surface of a plastic pipe in which a surface of the fitting and a portion of the cylindrical surface of the pipe in the area thereof to which said fitting is to be attached is heated so that the surfaces are in a molten state.

The preferred heating apparatus is a flexible heating blanket which can conform to the shape of the pipe surfaces being joined. The blanket has resistive heating elements which heat up when current is applied, the heat from the blanket being transferred to the respective pipe surfaces. When the parts reach an appropriate temperature, the host pipe and fitting are separated a very small distance and the heater blanket is removed. This can be accomplished by hand by simply wearing a thermal glove and pulling the blanket out, or by using tongs, automated equipment, etc. The heated parts are then quickly brought back together for the fusion step. Some type of pressure is typically applied to facilitate the heat fusion of the respective parts.

Thus, in one form, there is shown a method of forming a connection between a proximal end of a fitting and a cylindrical sidewall region of a second pipe. In the first step in the method, the proximal end of the fitting and the selected cylindrical sidewall region of the second pipe are heated with a special heating apparatus. The proximal end of the fitting defines an inner peripheral edge and an outer peripheral edge of material to be joined. The outer peripheral edge defines an arc length of contact of a base diameter of the fitting on the second pipe. The heating apparatus is used to apply heat to the proximal end of the fitting over the arc contact length and to the sidewalls of the second pipe until an entire surface of the distal end between the outer peripheral edge of the fitting and the sidewalls of the second pipe have reached a softening temperature of the selected material.

The heating step is performed with a heating apparatus which comprises a flexible heating blanket having opposed first and second sides sized and configured to mate with the proximal end of the fitting and the cylindrical exterior region of the second pipe and extend beyond the arc length of contact of the base diameter of the fitting on the second pipe.

After the heating step, the heating apparatus is removed. Next, the proximal end of the fitting is brought into position to directly contact the cylindrical sidewall region of the second pipe. Pressure is then applied to the fitting after the contacting step so that the proximal end of the fitting is pushed against the second pipe, applying even pressure about the circumference of the proximal end of the fitting on the second pipe to heat fuse the respective surfaces.

The flexible heating blanket can be formed of a variety of materials such as natural and synthetic elastomers, thermoplastics and other pliable polymeric type materials. For example, the blanket might be formed of a material such as silicone rubber, fiberglass Teflon™, ceramic mesh, Kapton™ or a PEEK™ film. The material selected must be flexible enough to allow the blanket to conform to the shape of the mating surfaces of the fitting and the cylindrical sidewalls of the host pipe when in use. The heat source for the blanket may conveniently be supplied by incorporating a resistive heating element within the body of the blanket. This can be accomplished by incorporating either metallic resistance heating wires or an etched metal circuit in the blanket material. These components are preferably connected electrically to a thermocouple which is used to control the heat applied by the blanket. In one preferred form, the heating blanket has a through hole in a mid-region thereof which can be used for vacuum equalization, if needed, for example during the heating and fusion steps of the process. The blanket may also be perforated in some cases.

Although the use of vacuum pressure is one way to achieve a degree of force on the respective parts to be fused, the step of applying pressure can be accomplished in a number of ways, such as by using mechanical devices such as clamps, by using hand pressure or by applying pressure with other hydraulic or pneumatic devices.

Additional objects, features and advantages will be apparent in the written description which follows.

DETAILED DESCRIPTION OF THE INVENTION

The invention described herein and the various features and advantageous details thereof are explained more fully with reference to the non-limiting examples which are illustrated in the accompanying drawings and detailed in the following description. Descriptions of well-known components and processes and manufacturing techniques are omitted so as to not unnecessarily obscure the workings of the invention. The examples used herein are intended merely to facilitate an understanding of ways in which the invention herein may be practiced and to further enable those of skill in the art to practice the invention. Accordingly, the examples should not be construed as limiting the scope of the claimed invention.

This invention relates to a method and apparatus for fusing a plastic fitting, typically a sidewall fitting, to a host plastic pipe. As has been briefly discussed, a known means of attaching a thermoplastic component to a thermoplastic pipe is by heat fusion. The term "heat fusion" as used herein means heating mating surfaces of a fitting and a portion of the exterior surface of a plastic pipe and while these surfaces are in molten states, to join the surfaces together under applied pressure and holding pressure against the components until the joined surfaces cool and thereby fuse to each other.

At the present time, plastic pipe is butt fused by first smoothing the ends. Then a large metal device using heater plates is inserted between the two adjacent pipe ends, which are being held in a fixture of some sort. The pipe ends are moved closer together and the heater plate is activated. At a given desired temperature, the heater plate is removed and the pipe ends are pushed together where they fuse. The butt fusion of one length of plastic pipe to another is a well known technique.

While the principles of the present invention could be applied to butt fusion, the primary use of the present invention relates not to butt fusion wherein one length of pipe is joined to another but to the fusion of a fitting to the sidewall of a host plastic pipe. Attaching a branch conduit (sidewall fusion) to the side of the host pipe is more difficult than butt fusion. A large metal heater having concave and convex surfaces is inserted between the host pipe and the branch conduit to be fused to perform a pre-melt step. After the parts are heated, the large metal heater must be withdrawn, which requires a good deal of space, and thus large separation of the branch and host pipes. A good deal of heat can be lost. The branch and host are then pushed together to fuse. In addition to the distance problem related to removing the large heating assembly after the pre-melt step, another disadvantage of the present methods is that various pipe sizes may be involved. Many separate convex-concave pairs of heavy metal heater plate tooling are required, for 2", 4", 6", 8", up to 63" diameter branch-outlet-tee fitting sizes.

The present inventive method uses a flexible heater blanket to heat the respective branch outlet base and the host pipe's sidewall. When the parts reach the appropriate temperature, the pipes are separated a very small distance, as compared to the state of the art practices described, and the heater blanket can then be removed. It is usually possible to remove the heating blanket by hand, using thermal gloves, by simply pulling it out. Then, the branch and host pipe are fused by placing the two together and applying pressure.

Figure 1:
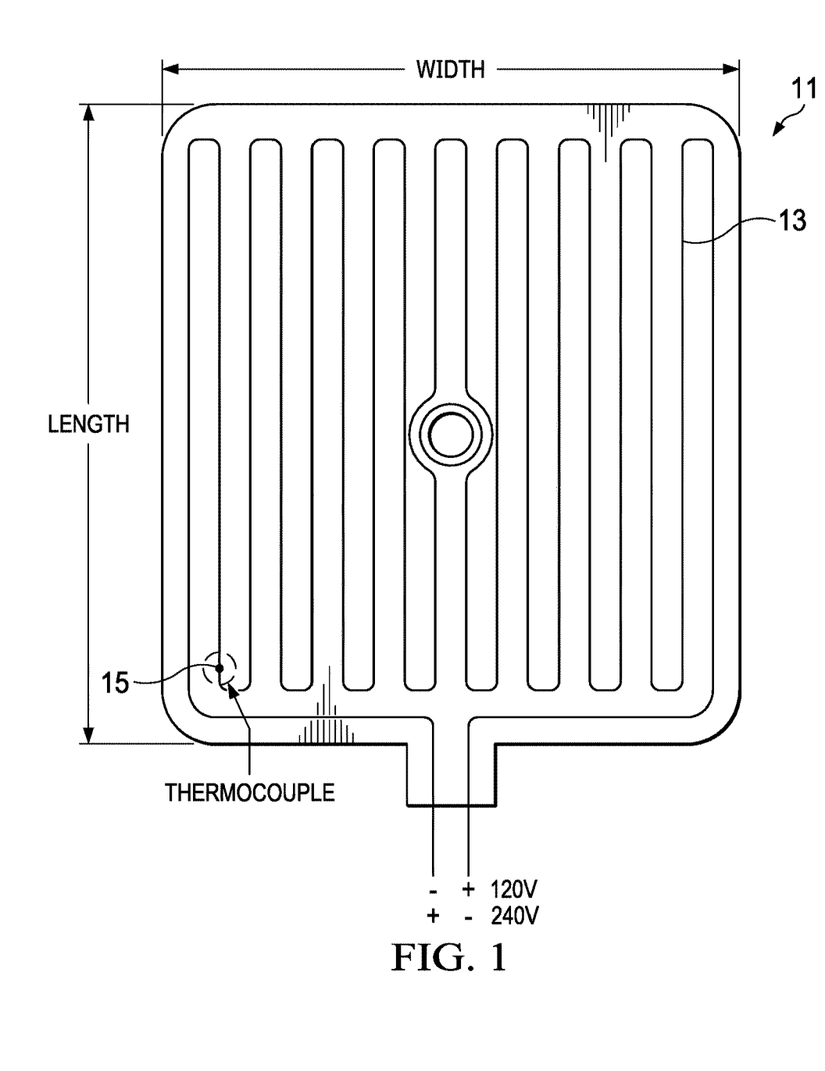
FIG. 1 is a plan view of the heating apparatus used in the method of the invention showing the heating wires which run through the polymeric material of the blanket and the placement of the thermocouple.

Such a heating blanket is shown in plan view in FIG. 1 of the drawings, designated as 11. The flexible blanket 11 can be made of any number of thermally resistant polymeric materials, including natural and synthetic elastomers and other materials including high temperature silicone rubber, fiberglass, Teflon™, ceramic mesh, Kapton™ and PEEK™ film. The size of the blanket will be determined at least in part by the size of the "coupon" to be removed from the host pipe and by the diameter of the host pipe. For example, the width in FIG. 1 might be 2 to 3 feet and the length might be 3 to 5 feet. The thickness will also depend upon the amount of heat required for the particular job at hand, which can typically be achieved with a blanket in the range from about 1%4 to 2 inches thick. The thicker the blanket, however, the more space is required for its removal during the fusion process, as will be further described. The blanket can also be provided with a through hole to allow for pressure equalization, if such is needed and may be perforated in some cases.

The flexible heating blanket 11 can be heated to a desired temperature using any convenient means, such as embedded electric resistance heating wires 13, or by thin etched metal circuits distributed within the heating blanket in a defined pattern and wattage density, usually in the range of 4 to 8 watts per square inch watt-density. The resistive elements are heated by a suitable power source, typically at 120 volts or 240 volts, illustrated schematically in FIG. 1.

When dealing with an HDPE host pipe, it is known that HDPE has a softening (non-fusion) temperature (Vicat Softening) of about 255° F. (125° C.). The HDPE pipe fabrication melt fusion temperatures desired will be in the range from about 375° F. to 425° F. (nominally 400° F.).

To control the flexible heating blanket 11 temperature, a commercially available controller (not shown) is used, which typically uses a thermocouple (15 in FIG. 1) to sense the temperature of the heating blanket, and report it back to the thermal controller. There are various kinds of temperature controllers that will be familiar to those skilled in the relevant arts, but the most common is the proportional controller. In this type of control scheme, when the temperature is cool or "low" the controller delivers an increased amperage to heat the wires 13 in the flexible blanket 11 quickly. Once the thermocouple 15 reports the blanket 11 temperature is nearing the desired set-point (in this case approximately 425° F.), the controller proportionally reduces the amperage so the temperature of the flexible blanket body temperature does not over-shoot the set-point. Once the heating blanket 11 has reached the desired temperature range, e.g., 400 to 450° F., the controller "trickles" in the appropriate amperage to hold the T/C reported temperature to just below to just above the desired set-point temperature.

The flexible heating blanket method described herein and the associated fusion-weld process is uniquely adaptable to custom diameter pipe mains, i.e., those requiring a custom radius branch saddle base, and a custom radius heater. For example, when installing custom diameter pipe mains using compression-fit technology, where branch outlet tees are required in the field, the host pipe wall is removed and a reducing tee branch outlet must be fusion-welded to the custom OD pipe main. The contour of the custom OD pipe main is measured or estimated, the branch outlet saddle is sawcut or machined to the same approximate radius, and the bendable, perforated heating blanket which conforms to the custom diameters, enables the components to be co-melted and fusion-welded under controlled interfacial fusion pressures known to create reliable fusion-weld joints. The process takes advantage of the fact that polyethylene is autohesive . . . it wants to "stick to itself" (documented), when molten.

Figure 2:
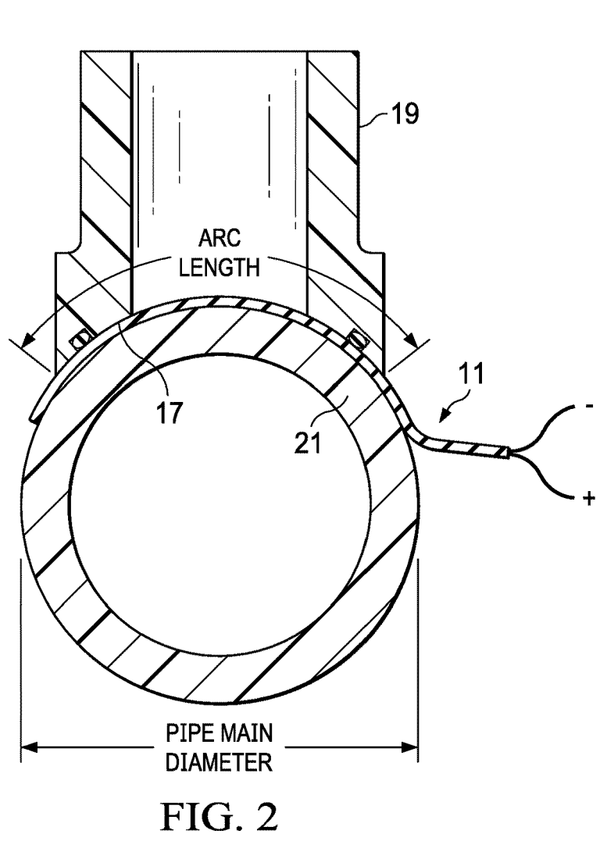
FIG. 2 is an end view of a polyethylene pipe which has a polyethylene fitting in place on the outer circumferential surface of the host pipe and with the heating blanket in place prior to starting the heating step.

FIG. 2 shows such a pipe arrangement wherein a connection is being formed between a proximal end 17 of a fitting 19 (in this case a polymeric branch outlet saddle fitting) and a cylindrical sidewall region of a second, host pipe 21. The proximal end 17 of the fitting and a selected cylindrical sidewall region 21 of the second pipe are shown in place with the heating blanket 11 being inserted between the two. An "arc length" shown in FIG. 2, defines a fusion interface for the two pipes. The arc length can be seen to be defined by a length of contact of a base diameter of the fitting on the selected cylindrical sidewall region of the second pipe, the heating apparatus being applied to the proximal end of the surface of the fitting and the selected sidewall region of the second pipe until the respective pipes have reached a softening temperature of the selected material. The heating blanket width is always greater than or equal to the polymeric saddle base diameter. The heating blanket length is always greater than or equal to the arc-length of contact of the base diameter on the pipe main. FIG. 2 shows the saddle base diameter on the pipe main diameter.

Figure 3:
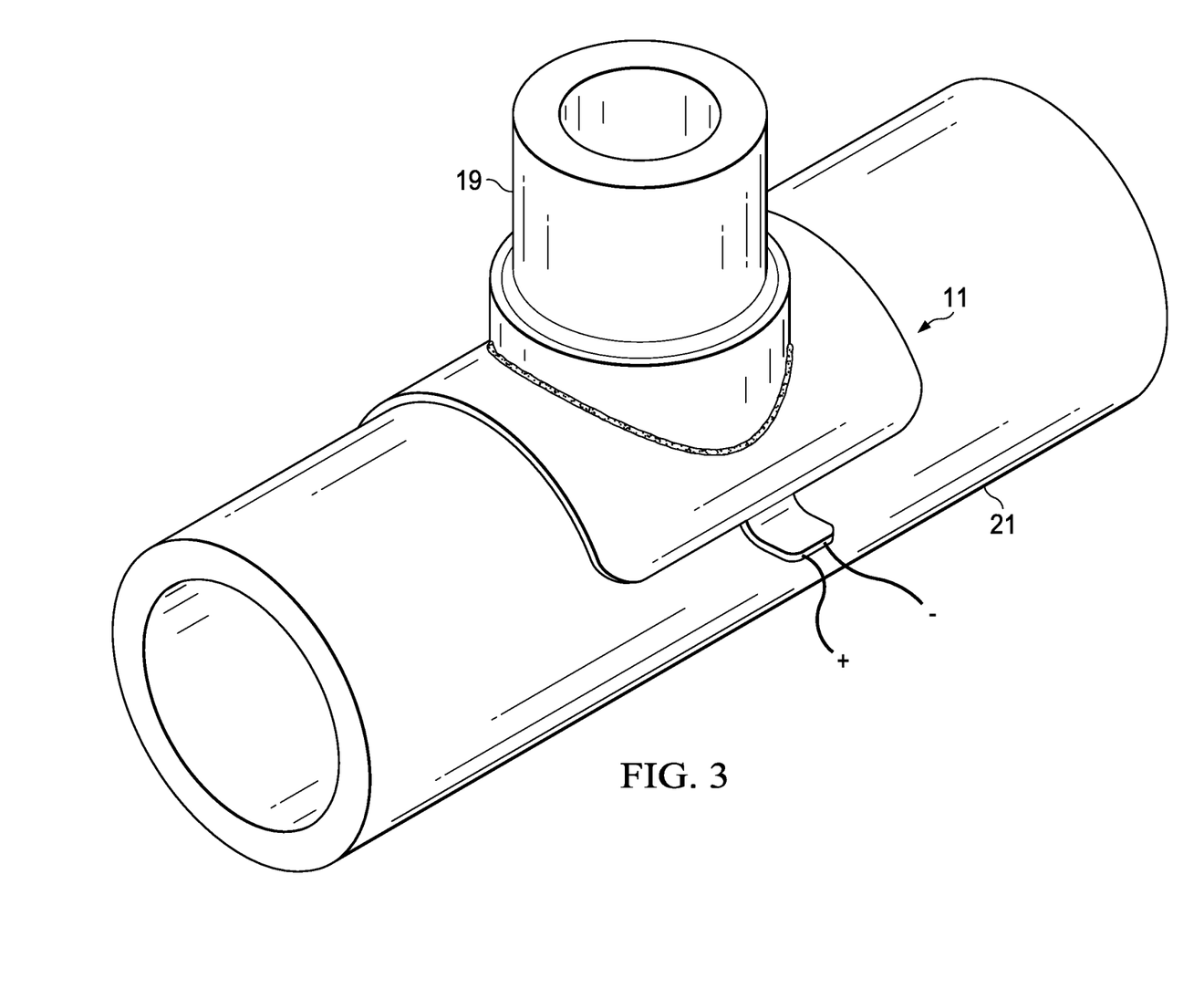
FIG. 3 is a perspective view of the host pipe and fitting of FIG. 2 with the heating blanket in place prior to the heating step.

FIG. 3 is a perspective view showing the respective sidewall fitting 19 and the host pipe 21 with the heating blanket 11 in place and ready to be connected to a power source, for example, the previously mentioned 120 volt or 240 volt power source.

As the melt process initiates, a low force can be applied to insure intimate contact and to increase heat transfer from the heat-blanket into the host pipe and the branch base. This low force can be developed by differential pressure applied to the branch outlet. The differential pressure can be developed by reducing the atmospheric pressure inside the branch outlet pipe, from 14.7-psi absolute, to a controlled absolute pressure, initially in the range of 8-psi to 12-psi absolute. This imposes a low melt-interface pressure to improve heat transfer to the melting surfaces, but is sufficiently low in intensity so as to not cause the viscous melt to be squeezed from the melt interface development. The low interfacial pressure and friction with the heater-blanket surface keeps the highly-viscous, developing melt-thickness in place.

It has been observed that the differential pressure from the atmosphere exerts a force equal to the following calculation: F=0.7854*(pipe ID)$^2$*(14.7 psi−Absolute pressure in ID) For example, at 7.0 absolute pressure inside a 22-inch diameter Dr 11 branch saddle with 14.7 psi atmospheric pressure outside, the force pushing on the branch base is:

$$F=0.7854*18^2*7.7 \text{ psi}=1959 \text{ lbs.}$$

With an enlarged 24-inch diameter base, the contact area is: (24-in OD×18" ID=») 198-sq-in. At controlled low heat-up interfacial pressure, the pressure is F/A=1959/198— 9.9-psi contact pressure for heat-up and melt development.

For final fusion, the differential-pressure could be raised to 14.7 psia−0.70-psia=14 psia The fusion interface pressure for melt bead flow and development can be, as in the prior example about 18-psi (in the range of 15-psi to 25-psi), depending on the branch outlet DR, which is sufficient to promote interface "wetting" resulting in interfacial intermolecular diffusion, which is based on time to cool and temperature at fusion. That molecular inter-diffusion and co-crystallization create the bond that gives the joint its strength.

With the branch outlet being perpendicular to the pipe-main, the force from differential pressure, (psia) will be uniformly distributed around the circumference of the saddle base. Based on the use of DR 9 pipe at a controlled 14-psia differential pressure, the fusion pressure can be 22-psi; and for Dr 32.5, the interfacial fusion pressure can exceed the industry standard value of 75-psi. As the DR rises, the ID area enlarges by the square of its diameter; and the base wall area declines by the square of its average diameter, such that the interfacial fusion pressure rises excessively with increasing DR, and needs to be controlled, by means of regulating the differential pressure, psi.

Figure 4:
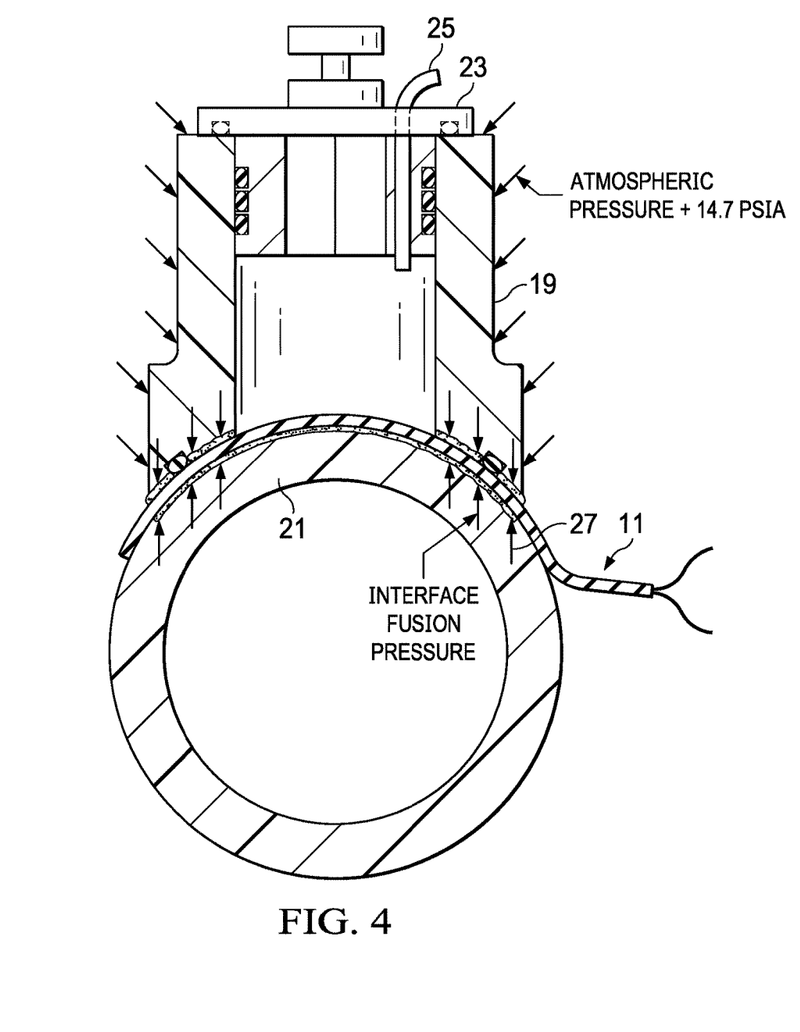
FIG. 4 is an end view, similar to FIG. 2, but showing the heating step in which the heating blanket is used to bring the pipe cylindrical outer surface and the mating fitting surface to the molten state.
Figure 5:
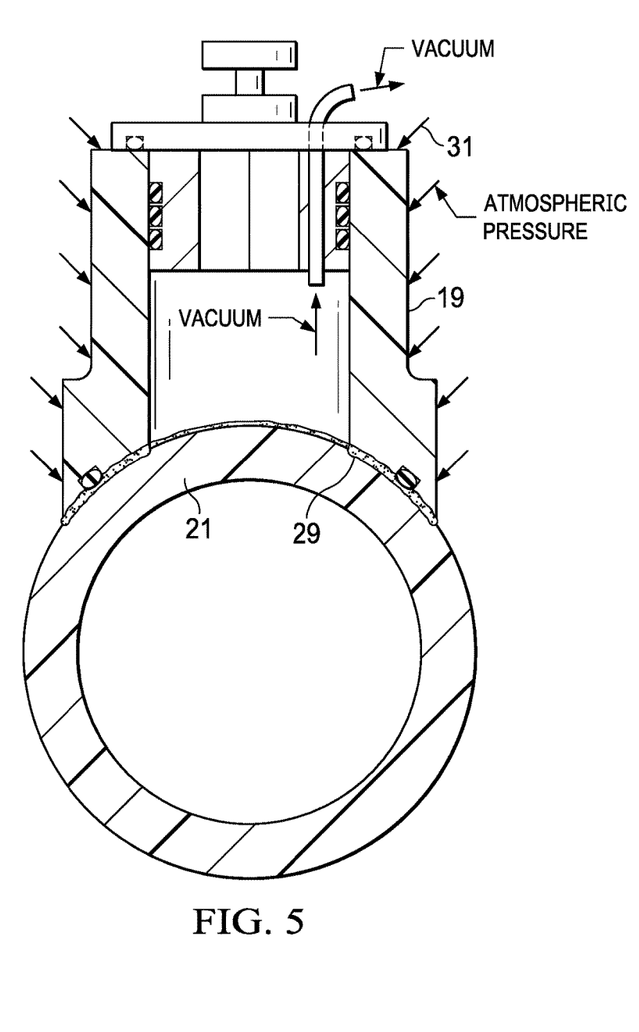
FIG. 5 is another end view, similar to FIG. 4, but showing the heating blanket being removed and pressure being applied to cause the respective molten surfaces to fuse.
Figure 6:
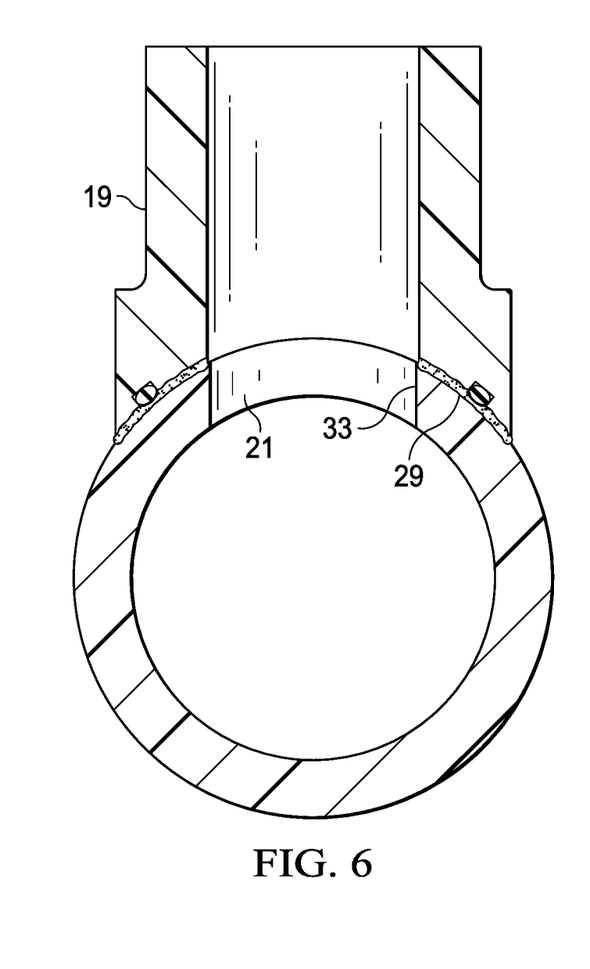
FIG. 6 is another end view of the process, showing the completed pipe main with the branch sidewall conduit fused thereto.

FIGS. 4-6 illustrate the next successive steps in the process. In FIG. 4, the fitting 19 is sitting atop the heating blanket 11 which covers the coupon area of the cylindrical host pipe 21. In order to apply pressure in the pre-melt step, the assembly is fitted with an expandable seal plug 23 with an internal tube 25 which can be connected to a vacuum source (not shown). There can thus be created a pressure differential between the vacuum (sub-atmospheric, zero psia) inside the fitting and the 14.7 psi outside atmospheric pressure. This creates an interfacial fusion pressure shown by the arrows 27 in FIG. 4, thereby assisting in the heat fusion interface of the fitting and host pipe.

After the heating step, the heating blanket is removed. In the next step, after the heating and removing steps, the proximal end of the fitting is brought into direct contact with the second pipe. Pressure is applied to the fitting after the contacting step so that the proximal end of the fitting is pushed against the second pipe, applying even pressure about the circumference of the proximal end of the fitting on the second pipe. FIG. 5 shows the assembly after the heating blanket has been removed, with vacuum again being used to exert a pressure on the melt interface 29. Atmospheric pressure is shown acting on the fitting exterior by arrows 31 in FIG. 5. FIG. 6 shows the finished fused and tapped assembly with the "tapped" thru-hole 33 formed by the coupon being removed.

While the method has been described with respect to a vacuum process being used to employ pressure, it will be understood that other methods can be used, as well. For example, the step of applying pressure in the pre-melt step can in some cases be a simple manual pressure applied to the branch outlet which is sufficient to bend and squeeze the deformable thin heating blanket to get an initial melt-film between the pipe-main, blanket.

There is thus envisioned the use of a flexible, bendable, conformable, resilient, perforated heating blanket made from high temperature resistant material warmed by internal electrical resistance metallic wires or other electrical resistance material. The preferred process provides a controllable, low, pre-heat melting pressure of 2 to 40 psi to promote heat transfer from the flexible heating blanket to the pipe main and branch outlet base. There is also envisioned a controllable, low interfacial melt-fusion (welding) pressure-range of 15 to 100 psi for perpendicular pipe-branch outlets, but with a preferred 75 psi pressure as an upper limit.

The fusion process is essentially a six-step process—clean, prepare (scrape, face), insert heating apparatus, heat and melt surfaces, remove heating apparatus, co-join melted surfaces under pressure, cool and examine. The low-pressure fusion joints which are achieved by the method of the invention makes a pipe "reducing" tee fabrication with joint strength at least equal to the strength of the parent pipe material. The ratio of the branch outlet diameter to pipe main diameter (reducing-tee diameter ratio) is typically restricted to the diameter ratio range of to 5% to 50%. The perpendicular branch saddles described need Tee base-reinforcement to create an outlet co-joined to the pipe main, which becomes a pressure component as strong as the parent pipes. The branch outlet cross-sectional base area of the branch needs to be larger than the cross-sectional area of the "hole" coupon removed from the pipe main. This intersecting base mass is estimated per ISO 10253-2: Pressure-Area Rules.

A number of advantages can be obtained through the practice of the described invention. The low-mass heating apparatus utilized can reach the desired heating temperature within about 5 minutes, versus perhaps an hour for "fixed dimension" concave-convex metallic (aluminum) heater plate sets of heavier mass. The synthetic material heat-blanket melts the contacting surfaces of both the pipe-main and perpendicular branch outlet base in a much more convenient amount of time. The perforated and flexible heating blanket described conforms to the out-of-round curvature of the pipe main and the branch-outlet saddle base. The heating blanket of the invention melts both surfaces simultaneously until they are conforming and intimately shaped to each other, as held against the pliable synthetic material of the relatively thin heating blanket. The flat nature of the heating blanket deforms/conforms to the curvature of the pipe-main and saddle base, but itself has no concave nor convex side(s), as do the prior art devices.

The cooled bond developed between the molten branch-outlet base and molten pipe main OD is a bond developed by molecular diffusion of the thermally mobilized molecules, at the two molten faces, into each other, across their prior boundaries. The plane of molecular inter-diffusion and co-crystallization across the prior two inter-faces is between 25 microns to 75 microns thick.

As briefly mentioned, simple manual pressure applied to the branch outlet is sufficient to bend and squeeze the deformable thin heat blanket to get an initial "melt-film" between the pipe-main, blanket, and saddle base, which eventually spreads into dimensional compliance. The respective surfaces mutually melt to the same curvature dimension and out of roundness.

The flexible heating blanket is ductile, resilient, and bendable to conform to the contour of the pipe-main and base, and to melt each surface until they have same geometry at the melt interface.

The differential pressure is controlled and regulated by removing atmospheric pressure from the ID of the branch outlet, during surface heating and during the fusion co-bonding process. This can be achieved by the use of a gas evacuation/suction pump, with non-collapsing hose, with air bleed and shut-off valve, and with absolute-pressure gage, along with a flat gum-rubber reinforced plate or tapered plug ("Cork") on or in the end of the branch outlet used to seal the differential pressure during melt-heating and fusion.

While the invention has been shown in only one of its forms, it is not thus limited but is susceptible to various changes and modifications therein without departing from the spirit thereof.

I claim:

1. A method of forming a connection between a proximal end of a fitting and a selected region of a second pipe, the fitting and second pipe being formed from a synthetic polymeric material, the method comprising the steps of:

heating the proximal end of the fitting and the selected region of the second pipe with a heating apparatus in a first step, the heating apparatus being applied under pressure to the proximal end of the fitting and the selected region of the second pipe until the fitting and the second pipe have reached a softening temperature;

after the heating step, removing the heating apparatus from the fitting and second pipe;

after the heating and removing steps, directly contacting the proximal end of the fitting to the second pipe;

again exerting pressure so that the proximal end of the fitting is pushed against the second pipe to thereby fuse the fitting and second pipe;

wherein the heating step is performed with a heating apparatus which comprises a deformable thin flexible heating blanket having opposed first and second sides sized and configured to mate with the proximal end of the fitting and the selected region of the second pipe for heating the respective fitting and second pipe to a fusion temperature; and wherein the pressure which is applied during the heating step to the second pipe and fitting is sufficient to bend and squeeze the deformable thin flexible heating blanket to get an initial melt-film between the second pipe, deformable thin flexible blanket and fitting.

2. The method of claim 1, wherein the deformable thin flexible heating blanket has formed therein either metallic resistance heating wires or an etched metal circuit which are connected electrically to a thermocouple which is used to control the heat applied by the blanket.

3. The method of claim 2, wherein the step of applying pressure is accomplished by using a mechanical device, by using hand pressure, or by applying negative or positive pressure hydraulically or pneumatically applied.

4. The method of claim 1, wherein the deformable thin flexible heating blanket has a through hole in a mid-region thereof which can be used for vacuum equalization.

5. The method of claim 1, wherein the deformable thin flexible heating blanket is perforated.

6. The method of claim 1, wherein the deformable thin flexible heating blanket fusion-weld method described is used for forming custom diameter pipe mains, requiring custom radius branch saddle bases, and the use of a custom radius heater.

7. A method of forming a connection between a proximal end of a fitting and a cylindrical sidewall region of a second, host pipe, the fitting and second, host pipe being formed from a material selected from the group consisting of polyethylene, polyvinyl chloride or polypropylene, the method comprising the steps of:

heating the proximal end of the fitting and a selected cylindrical sidewall region of the second, host pipe with a heating apparatus in a first step, the proximal end of the fitting defining a fusion interface for the fitting and the second, host pipe defined by an arc length of contact of a base diameter of the fitting on the selected cylindrical sidewall region of the second, host pipe, the heating apparatus being applied under pressure to the proximal end of the fitting and the selected cylindrical sidewall region of the second, host pipe until the respective second, host pipe and fitting have reached a softening temperature of the selected material;

after the heating step, removing the heating apparatus from the fitting and second, host pipe;

after the heating and removing steps, directly contacting the proximal end of the fitting to the second, host pipe;

again applying pressure to the fitting after the contacting step so that the proximal end of the fitting is pushed against the second, host pipe, applying even pressure about the circumference of the proximal end of the fitting on the second, host pipe;

wherein the heating step is performed with a heating apparatus which comprises a deformable thin flexible heating blanket having opposed first and second sides sized and configured to mate with the proximal end of the fitting and the cylindrical sidewall region of the second, host pipe and extend beyond the arc length of contact of a base diameter of the fitting on the selected cylindrical sidewall region of the second, host pipe; and wherein the pressure applied during the heating step to the second, host pipe and fitting is sufficient to bend and squeeze the deformable thin flexible heating blanket to get an initial melt-film between the second pipe, deformable thin flexible heating blanket and fitting, which eventually spreads into dimensional compliance.

8. The method of claim 7, wherein the deformable thin flexible heating blanket is formed from a material selected from the group consisting of natural and synthetic elastomers and thermoplastics, the material being flexible enough to allow the blanket to conform to a given shape of the cylindrical sidewall region of the second, host pipe when in use.

9. The method of claim 8, wherein the deformable thin flexible heating blanket is formed from polytetrafluroethylene.

10. A method of forming a connection between a proximal end of a fitting and a selected region of a second, host pipe, the fitting and second, host pipe being formed from a synthetic polymeric material, the method comprising the steps of:

heating the proximal end of the fitting and the selected reion of the second, host pipe with a heating apparatus in a first step, the heating apparatus being applied to the proximal end of the fitting and the selected region of the second, host pipe until the fitting and the second, host pipe have reached a softening temperature;

after the heating step, removing the heating apparatus from the fitting and second, host pipe;

after the heating and removing steps, directly contacting the proximal end of the fitting to the second, host pipe;

exerting pressure so that the proximal end of the fitting is pushed against the second, host pipe to thereby fuse the fitting and second, host pipe;

wherein the heating step comprises a step in a fusion-weld method and is performed with a heating apparatus which comprises a flexible heating blanket having opposed first and second sides sized and configured to mate with the proximal end of the fitting and the selected region of the second, host pipe for heating the respective fitting and second, host pipe to a fusion temperature;

wherein the flexible heating blanket fusion-weld method described is used for forming custom diameter pipe mains, requiring custom radius branch saddle base, and the use of a custom radius heater;

wherein, when the fusion-weld method is used as a part of a method of installing custom diameter pipe mains using compression-fit technology, where branch outlet tees are required in the field, and where the second, host pipe has a wall section which is removed at a selected location, and a reducing tee branch outlet must be fusion-welded to a custom outer diameter of the second, host pipe, the method further comprising the steps of:

measuring or estimating a contour of the custom outer diameter of the second, host pipe;

saw cutting or machining a branch outlet saddle to the previously measured or estimated contour of the custom outer diameter of the second, host pipe;

installing a flexible, perforated heater blanket which has been sized to conform to the previously measured or estimated contour of the outer diameter of the second, host pipe, thereby enabling the components to be co-melted and fusion-welded under controlled interfacial fusion pressures to create a fusion-weld joint.

11. The method of claim 10, using as the heating apparatus a flexible, bendable, conformable, resilient, perforated heating blanket made from high temperature resistant material warmed by internal electrical resistance metallic wires or other electrical resistance material.

12. The method of claim 10, using a controllable, low, pre-heat melting pressure of approximately 2 to 40 psi to promote heat transfer from the flexible heating blanket to the second, host pipe and to the reducing tee branch outlet.

13. The method of claim 10, wherein the branch outlet is a perpendicular pipe-branch outlet, the method further comprising the step of using a controllable, low interfacial melt-fusion pressure-range of approximately 5 to 100 psi.

14. The method of claim 13, wherein a maximum of 75 psi pressure is used.

15. The method of claim 10, using a HDPE pipe fabrication polymer melt fusion temperature in the range of 375 to 420° F.

16. The method of claim 10, wherein a ratio of branch outlet diameter to second, host pipe main diameter is calculated, the ratio of the branch outlet diameter to second, host pine main diameter being in the range of to 5% to 50%.

17. A method of forming a connection between a proximal end of a fitting and a selected region of a second pipe, the fitting and second pipe being formed from a synthetic polymeric material, the method comprising the steps of:
heating the proximal end of the fitting and the selected region of the second pipe with a heating apparatus in a first step, the heating apparatus being applied to the proximal end of the fitting and the selected region of the second pipe until the fitting and the second pipe have reached a softening temperature;
after the heating step, removing the heating apparatus from the fitting and second pipe;
after the heating and removing steps, directly contacting the proximal end of the fitting to the second pipe;
exerting pressure so that the proximal end of the fitting is pushed against the second pipe to thereby fuse the fitting and second pipe;
wherein the heating step is performed with a heating apparatus which comprises a flexible heating blanket having opposed first and second sides sized and configured to mate with the proximal end of the fitting and the selected region of the second pipe for heating the respective fitting and second pipe to a fusion temperature;
wherein the flexible heating blanket is a custom dimensioned, flat, perforated blanket, with a surface waft intensity of 4 to 8 watts per square inch.

18. The method of claim 17, wherein the flexible heating blanket reaches fusion temperature within approximately 5 minutes or less.

19. A method of forming a connection between a proximal end of a fitting and a selected region of a second pipe, the fitting and second pipe being formed from a synthetic polymeric material, the method comprising the steps of:
heating the proximal end of the fitting and the selected region of the second pipe with a heating apparatus in a first step, the heating apparatus being applied under pressure to the proximal end of the fitting and the selected region of the second pipe until the fitting and the second pipe have reached a softening temperature;
after the heating step, removing the heating apparatus from the fitting and second pipe;
after the heating and removing steps, directly contacting the proximal end of the fitting to the second pipe;
again exerting pressure so that the proximal end of the fitting is pushed against the second pipe to thereby fuse the fitting and second pipe;
wherein the heating step is performed with a heating apparatus which comprises a deformable thin flexible heating blanket having opposed first and second sides sized and configured to mate with the proximal end of the fitting and the selected region of the second pipe for heating the respective fitting and second pipe to a fusion temperature,
wherein the pressure applied during the heating step is a simple manual pressure applied to the second pipe and fitting which is sufficient to bend and squeeze the deformable thin flexible heating blanket to get an initial melt-film between the second pipe, deformable thin flexible heating blanket and fitting, which eventually spreads into dimensional compliance.

* * * * *